Figure 1:
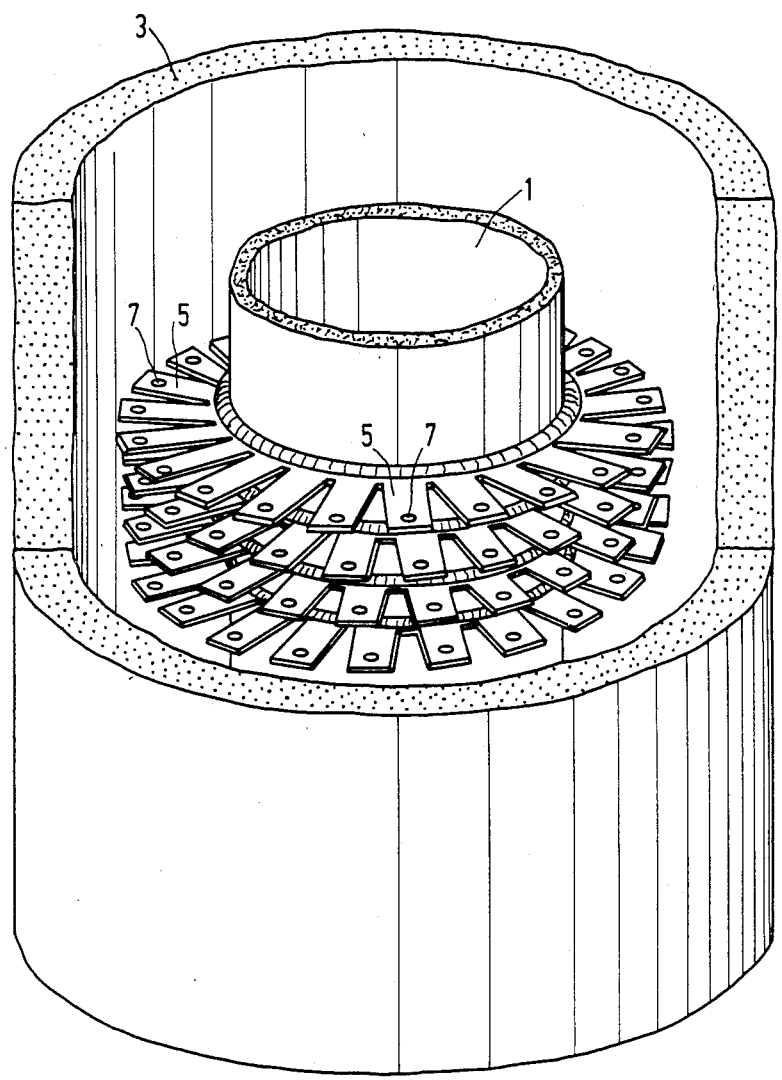

United States Patent [19]

van de Sluys et al.

[11] Patent Number: 4,648,441
[45] Date of Patent: Mar. 10, 1987

[54] HEAT EXCHANGER COMPRISING A FINNED PIPE

[75] Inventors: Willem L. N. van de Sluys; Jacobus Pastoor; Johannus C. M. Roelofs, all of Eindhoven, Netherlands

[73] Assignee: U.S. Philips Corporation, New York, N.Y.

[21] Appl. No.: 728,437

[22] Filed: Apr. 29, 1985

[30] Foreign Application Priority Data

Oct. 30, 1984 [NL] Netherlands ............... 8403278

[51] Int. Cl.$^4$ ............................................. F28B 3/02
[52] U.S. Cl. ........................................ 165/111; 165/115; 165/184; 261/156; 261/140.2
[58] Field of Search ............... 165/184, 60, 110, 111, 165/115, DIG. 18; 261/153, 140 A, 156

[56] References Cited

U.S. PATENT DOCUMENTS

| 1,900,674 | 3/1933 | Taylor | 165/181 X |
| 2,471,582 | 5/1949 | Poole | 165/181 |
| 2,870,999 | 1/1959 | Söderström | 165/184 |
| 2,896,426 | 7/1959 | Ayling | 165/110 X |
| 3,901,312 | 8/1975 | Pasternak | 165/181 |
| 3,947,941 | 4/1976 | O'Connor et al. | 165/181 X |

FOREIGN PATENT DOCUMENTS

| 65220 | 12/1946 | Denmark | 165/184 |
| 471928 | 6/1952 | Italy | 165/184 |
| 0217197 | 12/1983 | Japan | 165/184 |
| 8200597 | 3/1982 | PCT Int'l Appl. | 165/60 |
| 237258 | 8/1945 | Switzerland | 165/181 |
| 414705 | 12/1966 | Switzerland | 165/181 |

Primary Examiner—Albert W. Davis, Jr.
Assistant Examiner—Randolph A. Smith
Attorney, Agent, or Firm—Rolf E. Schneider

[57] ABSTRACT

A heat exchanger comprises a vertically arranged circular-cylindrical holder closed at its upper end and at its lower end, and a pipe coaxially arranged within the holder. A fin is secured to the inner pipe and consists of a plurality of interconnected lamellae extending radially from the pipe, the fin being helically wound around the pipe so that the adjacent lamellae of successive turns of the resulting helix overlap each other in part, viewed in the circumferential direction of the pipe. A capillary passage is located in each lamella above the surface of an underlying lamella in a position shifted with respect to the capillary passage of the underlying lamella.

9 Claims, 7 Drawing Figures

HEAT EXCHANGER COMPRISING A FINNED PIPE

This invention relates to a heat exchanger comprising a finned metal pipe arranged in a holder, in which a metal fin secured to the pipe consists of a number of interconnected lamellae, the metal fin being helically wound around the pipe so that the adjacent lamellae of successive turns of the resulting helix overlap each other in part, viewed in the circumferential direction of the pipe.

In a known heat exchanger of this type (see U.S. Pat. No. 3,723,693), heat exchange takes place between a first liquid flowing in the pipe and a second liquid flowing between the holder and the pipe along the lamellae of the fin. Such a heat exchanger is not intended for the mass transfer (enrichment or impoverishment) between a gas and a liquid both situated between the holder and the pipe, while at the same time heat transfer takes place by means of a cooling liquid or a heating liquid flowing in the pipe. In this case, the heat exchanger would act as a so-called heat-mass-exchanger. The mass transfer would then be comparatively small, however, because no intimate contact is present between the gas and the liquid. It should be noted that the book "Handbuch der Kältetechnik", Volume VII, pp. 391-393 of R. Plank (published in 1959) discloses a heat-mass-exchanger used in a so-called drop absorber, in which a solution of a work medium and a solvent is conducted along the outer side of a number of helical pipes which are vertically arranged in a holder and along which also the gas flows which is to be absorbed in the solution. The liquid to be heated flows in the pipes. Since the turns of the pipes are located close to each other, a continuous film of liquid solution is often formed on the pipes. The desired drop formation occurs only incidentally. A weak superficial mixing with the gas to be absorbed (enrichment) takes place in the film. It has also been suggested to enlarge the surface area available for the heat-mass-exchange by providing the pipes with lamellae. However, there is again formed on the lamellae a film of the solution, which is mixed only to a small extent with the gas to be absorbed flowing along the lamellae.

The present invention has for its object to provide a heat exchanger acting as a heat-mass-exchanger, in which an optimum mixing between gas and liquid takes place. Such a heat exchanger can be used both in the process industry and in absorption heat pumps.

The invention is for this purpose characterized in that each of the lamellae is provided with a capillary passage, which, with a vertically arranged pipe, is located above the surface of an underlying lamella in a shifted position with respect to the capillary passage of the said underlying lamella while the lamellae are arranged so as to be clear of the inner wall of the holder.

The capillary passages in the lamellae promote to a great extent the formation of a regular pattern of drops. Since vapour can flow on all sides around these falling drops, the drops are in themselves thereby enriched by the gaseous work medium with the use of the heat exchanger in an absorber. Furthermore, the drops falling on an underlying lamella cause an intensive mixing of the comparatively hot upper layer in the film of the solution on the lamella already considerably enriched by the flowing gas with the poorer comparatively cold lower layer in this film. With the use of the heat exchanger in a generator for an absorption heat pump, the falling drops cause an intensive mixing of the already impoverished lower layer in the film with the richer upper layer in this film. The impoverishment of the solution desired in the generator is thus considerably intensified. The hot gaseous work medium ascending in the generator moreover gets into contact with the falling drops and the richer upper layer of the film so that an additional quantity of rich gas is generated.

A particular embodiment of the heat exchanger, which provides a compact absorber that can be mass-produced in a simple manner, is further characterized in that the finned pipe comprises a first pipe, which is closed at its upper end and its lower end and within which extends a coaxial second pipe, which is open at both ends and is in open communication at its upper end with an inlet of the first pipe and is connected at its lower end to an outlet passed through the lower end of the first pipe, while the space between the holder and the first pipe is connected near the upper end of the holder to a first inlet and a second inlet of the holder and is connected near the lower end of the holder to an outlet.

A further particular embodiment of the heat exchanger, which provides a compact generator that can be mass-produced in a simple manner, is characterized in that the finned pipe is closed at its upper end passed into the holder and is connected near its lower end to a vessel arranged outside the holder, while the holder is provided near the upper end of the pipe with an inlet and a first outlet and is provided near its lower end with a second outlet.

A preferred embodiment of the heat exchanger, in which liquid flows in a radial direction over the lamellae, is characterized in that the lamellae of the vertically arranged pipe are downwardly directed with their free ends directed radially outwards.

Figure 2:
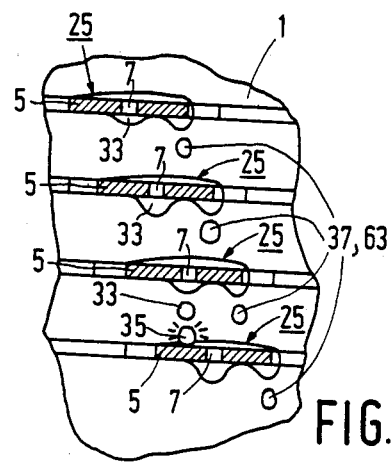
Figure 3:
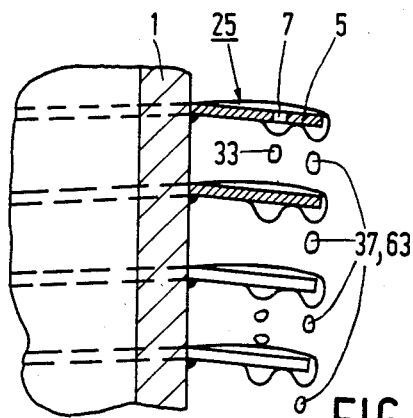
Figure 4:
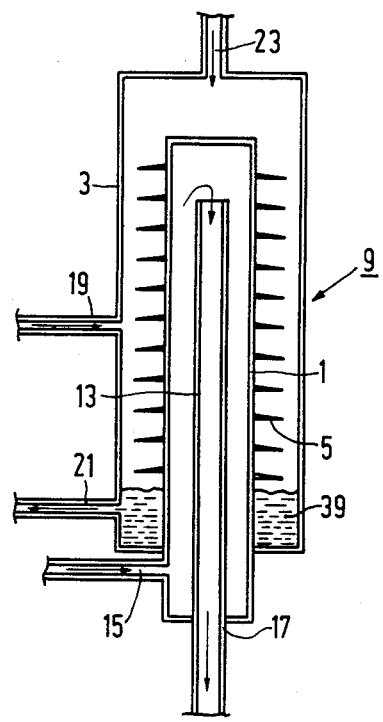
Figure 5:
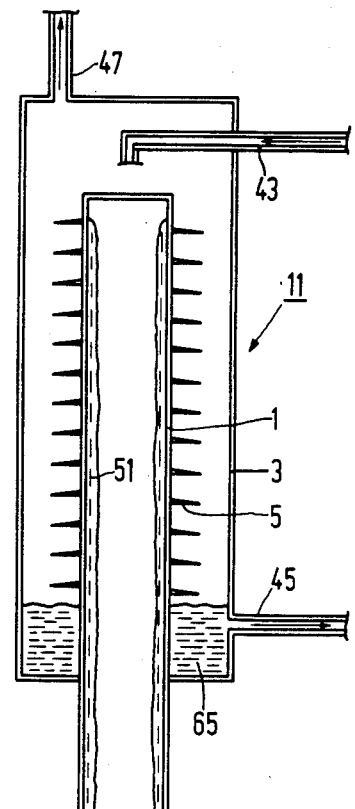
Figure 6:
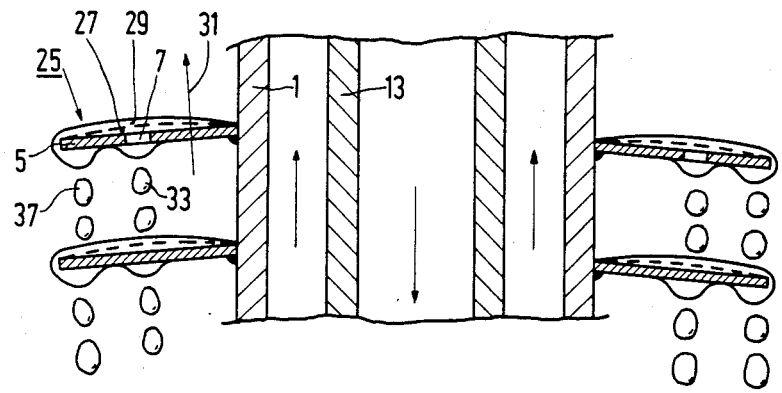
Figure 7:
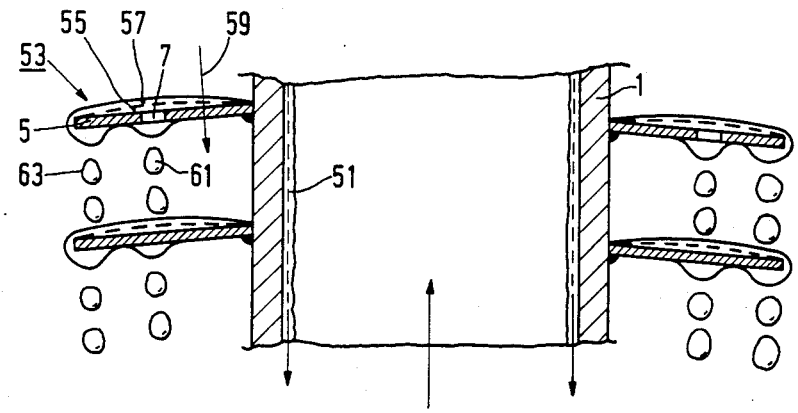

The invention will now be described more fully with reference to the accompanying drawings in which:

FIG. 1 is a partial perspective view on an enlarged scale of a heat exchanger according to the invention, FIG. 2 shows on a further enlarged scale the flow pattern along a number of lamellae of the heat exchanger shown in FIG. 1 in a first direction, FIG. 3 shows on a further enlarged scale the flow pattern along a number of lamellae of the heat exchanger shown in FIG. 1 in a second direction, FIG. 4 shows a first embodiment of the heat exchanger constructed as an absorber, FIG. 5 shows a second embodiment of the heat exchanger constructed as a generator, FIG. 6 shows on an enlarged scale the temperature course in the liquid film on a lamella as used in the heat exchanger shown in FIG. 4, FIG. 7 shows on an enlarged scale the temperature course in the liquid film on a lamella as used in the heat exchanger shown in FIG. 5.

The heat exchanger shown in FIG. 1 comprises a circular metal pipe 1 of thermally good conducting material, such as, for example, steel. The pipe 1 is surrounded by a coaxial circular-cylindrical metal holder 3. To the outer wall of the pipe 1 is welded a metal fin which consists of a plurality of interconnected rectangular lamellae 5, the metal fin being helically wound around the pipe 1, the adjacent lamellae 5 of successive turns of the resulting helix overlapping each other in part, viewed in the circumferential direction (tangential direction) of the pipe 1 (see also FIG. 2). Each of the lamellae 5 is provided with the pipe 1 capillary passage 7, which, with a vertically arranged, is located above the surface of an underlying lamella 5. The capillary passage of the overlying lamella is shifted in position with respect to the capillary passage of the adjacent underlying lamella. The lamellae 5 are arranged so as to be clear of the inner wall of the holder 3 and are directed slightly downwards at their free ends. The diameter of the pipe 1 is comparatively large with respect to the length (viewed in a radial direction) of the lamellae 5.

In the present case, the rectangular lamellae 5 have a length of 20 mm, a width of 9 mm and a thickness of, for example, 1 mm. The outer diameters of the pipe 1 and the holder 3 are 60 mm and 125 mm, respectively, while the wall thicknesses are 2.5 mm and 2.5 mm. Due to the pitch angle (0.05 radian) of the helical line formed, the lamellae 5, viewed over their width (tangential direction), are directed downwards (see FIG. 2). As stated, the lamellae 5, viewed in radial direction, are also slightly directed downwards (angle of 0.05 radian). The lamellae 5 consequently hang downwards effectively in two orthogonal directions. The vertical distance between two adjacent lamellae 5 in successive turns is about 9 mm. The capillary passages are located approximately at the centre (tangential direction) in the front part (radial direction) of the lamellae.

The heat exchanger constituted by the pipe 1 and the holder 3 is used for transferring heat between a gaseous or liquid first medium flowing in the pipe 1 and a liquid second medium flowing and dripping downwards in a the cascase over lamellae 5 in the space between the pipe 1 and the holder 3 as well as for transferring gas mass from and to the second medium. The liquid second medium consists of a solution of a so-called work medium and a solvent. Essentially, two cases should be distinguished, i.e. the use of the heat exchanger as a so-called absorber and its use as a so-called generator. In both applications, the heat exchanger becomes a so-called heat-mass-exchanger, in which besides a heat transfer also a gas mass transfer takes place. Depending upon the kind of solution used, the diameter of the capillary passages varies. If as a work medium ammonia and as a solvent water are used, the said diameter of the capillary passages 7 is preferably 2 mm, while the thickness of the lamellae 5 is preferably 1 mm.

In the case of the absorber 9 shown in FIG. 4, a coaxial second pipe 13 is situated within the first pipe 1, which is closed at both ends. The pipe 13 is in open communication at its upper end with an inlet 15 of the first pipe 1 via the annular space between the two pipes. The open lower end of the second pipe 13 is connected to an outlet 17 passed through the lower end of the first pipe 1. The space between the closed-end holder 3 and the first pipe 1 is connected to a first inlet 19 and an outlet 21. Furthermore, the latter space is connected to a second inlet 23, which is located at the upper side of the holder 3. The operation of the absorber 9 is as follows.

A liquid solution of work medium and solvent poor in work medium, for example ammonia and water, at a comparatively high temperature is sprayed into the space between the holder 3 and the first pipe 1 through the second inlet 23. This solution flows downwards under the influence of the force of gravity in a the cascade over lamellae 5. Comparatively cold gaseous work medium (ammonia gas) is passed into the space between the holder 3 and the first pipe 1 through the first inlet 19. A liquid or gaseous cooling medium (for example water or air) at a comparatively low temperature flows through the inlet 15 into the space between the first pipe 1 and the second pipe 13, enters the second pipe near the upper end of the first pipe 1 and leaves this second pipe via the outlet 17. The solution flowing downwards forms a liquid film 25 on each of the lamellae 5 (see FIGS. 2, 3 and 6). This liquid film 25 can be assumed to be composed of a comparatively cold lower layer 27 and a comparatively hot upper layer 29. The temperature in the liquid film on the lamella 5 increases, as indicated by the arrow 31 in FIG. 6. Drops 33 are formed below the capillary passages 7 and fall on the film 25 of an underlying lamella 5. The various stages of the formation of the drops 33 are shown in FIG. 2 with reference to four lamellae 5. The gaseous work medium present in the space between the holder 3 and the first pipe flows around the film 25 and the drops 33. The upper layer 29 of the film 25 and the drops 33 then absorb ammonia gas. In the film 25, an intensive mixing of the already considerably enriched comparatively hot upper layer 29 with the poorer comparatively cold lower layer 27 takes place throughout the film 25. This mixing is shown more clearly on the lower-most lamella 5 with reference to a drop 35 falling on it. Thus, the film 25 is cooled throughout its thickness so that the absorption of ammonia is promoted and is more uniform in the whole film 25, while at the same time a homogeneous concentration of work medium is obtained in the film 25. Since the lamellae 5 are directed downwards with their free ends and one longitudinal edge, the film 25 flows just in front of the relevant edges from the lamella 5 downwards in the form of drops 37 (see FIG. 3). Due to the downwardly directed lamellae 5, it is achieved that the largest possible quantity of solution flows over the lamellae, while it is moreover avoided that an excess quantity of solution flows along the outer wall of the first pipe 1. The drops 33 fall on the film 25 of an underlying lamella 5 at an area which is shifted with respect to the underlying capillary passage 7. As a result, the mixing process is promoted, while the formation of drops below the capillary passages is not or substantially not disturbed. Moreover, with capillary passages arranged vertically below each other, effectively a continuous flow without drops would be obtained, which reduces the absorption effect. The liquid flowing through the capillary passages ensures that a comparatively thin liquid film is formed on the lamellae so that a good heat transfer is realized. A quantity of enriched liquid solution 39 is collected in the lower part of the holder 3 and is then discharged via the outlet 21.

In the case of the generator 11 shown in FIG. 5, the pipe 1 passed into the closed end holder 3 is closed at its upper end and is connected at its lower end passed to the outside through the bottom of the holder 3 to a vessel 41. The holder 3 is provided near the upper end of the pipe 1 with an inlet 43 and is provided at its lower end with a first outlet 45. The inlet 43 and the first outlet 45 are both connected to the space between the holder 3 and the pipe 1. Furthermore, a second outlet 47 is connected to the said space near the upper end of the holder 3. The vessel 41 contains an evaporation and condensation medium 49, such as, for example, water, which is heated by a heat source not shown, for example a gas burner. The evaporated water ascends in the pipe 1 and condenses on the comparatively cold inner wall of such paper. A condensation film 51 is then formed on the inner wall of the pipe 1. The condensate flows under the influence of the force of gravity back to the vessel 41. The pipe 1 and the vessel 41 consequently act as a kind of heat pipe (thermo-siphon). The condensing water vapour gives off heat to the comparatively cold rich solution which is supplied through the inlet 43 and flows and drips downwards in a cascade over lamellae 5. There is formed on the lamellae 5 a film layer 53 of a solution comprising a comparatively hot lower layer 55 and a comparatively cold upper layer 57 (see FIG. 7). Viewed over a longitudinal sectional view of a lamella 5, the temperature in the liquid film 53 on the lamella 5 increases in the direction of the arrow 59. The lower layer 55 already impoverished by boiling is mixed with the richer upper layer 57. In the case of film evaporation, the impoverished heavier upper layer 57 sinks into the lower layer 55. A further mixing is obtained in that a drop 61 formed laterally below the capillary passage 7 falls from the overlying lamella onto the film of the adjacent underlying lamella. Due to this intensive mixing, a more uniform temperature increase in the film 53 is obtained, which leads to a strong expulsion of gaseous work medium from the film 53. Drops 63 are also formed just in front of the downwardly directed edge and the free end of the lamella 5 and these drops fall downwards on the film 53 of the underlying lamella and cause a further mixing in the film 53. Moreover, already expelled gaseous work medium flows around both the falling drops 61 and the drops 63 so that an additional quantity of gaseous work medium is obtained from the falling drops. The gaseous work medium is discharged through the second outlet 47, for example, to a condenser. Impoverished solution 65 is collected in the lower part of the holder 3 and is discharged through the first outlet 45, for example to an absorber, in order to be enriched again and then to be conducted back to the generator 11.

The absorber 9 and the generator 11 as described may be used in the process industry, where there is a strong need for devices for enriching and impoverishing solutions which contain constituents having a comparatively low boiling point and a comparatively high boiling point, respectively. Due to the use of the heat exchanger described, which permits of obtaining a maximum mixing in film layers, an optimum enrichment or impoverishment of such a solution may be obtained. The heat exchanger is of particular advantage when used in absorbers or generators of so-called absorption heat pumps. Due to the comparatively simple construction of the heat exchanger, the latter can be mass-produced at low cost. This is of particular importance for heat pumps which are used for heating or cooling private houses.

It should be noted that the medium passed through the inlet 15 into the pipe 1 of the absorber 9 may also be passed entirely in a flow direction opposite to that of the solution to be enriched through the pipe 1. The second pipe 13 may then be dispensed with. However, it is then necessary to provide an additional outlet in the holder 3. The holder 3 of the absorber 9 and the generator 11 are each preferably provided with a thermally insulating coating. The second pipe 13 is preferably also provided with such a coating or is entirely made of thermally insulating material. The vessel 41 in the generator may be heated by a gas or oil burner, but electrical heating is also possible. Furthermore, heating may be effected by means of flue gases or waste heat, for example with the aid of a heat exchanger arranged in the vessel 41.

Although the invention is described with reference to finned pipes, in which a considerable drop formation takes place near the free ends and the downwardly directed longitudinal edges of the lamellae, it is not limited thereto. The extent to which the said drop formation takes place depends upon a large number of parameters. Important parameters in this connection are:

the liquid flow rate to be processed,
the mass pair used (surface tension/extent of wetting),
the sharpness of the edges of the lamellae,
the value of the angle at which the free ends of the lamellae are directed downwards,
the value of the pitch angle of the helical line,
the diameter of the capillary passages.

For example, in the case of sharp edges of the lamellae and substantially horizontal lamellae, a comparatively small number of drops will be formed near the free ends and the longitudinal edges of the lamellae. The drop formation then takes place mainly below the capillary passages, which process substantially the whole quantity of liquid. In the case of lamellae hanging strongly downwards, both kinds of drop formation occur. The drops formed below the capillary passages then slide along the lower side of the lamellae slightly towards the free ends and the longitudinal edges. In practice, it will have to be ascertained empirically, which combination of parameters is to be preferred.

What is claimed is:

1. A heat exchanger which comprises a vertically arranged circular-cylindrical holder closed at its upper end and at its lower end; an inner pipe coaxially arranged within the holder; a fin secured to the inner pipe and consisting of a plurality of interconnected lamellae extending radially from the pipe, said fin being helically wound around the pipe so that the adjacent lamellae of successive turns of the resulting helix overlap each other in part, viewed in the circumferential direction of the pipe; and a capillary passage located in each lamella above the surface of an underlying lamella in a position shifted with respect to the capillary passage of the underlying lamella.

2. A heat exchanger according to claim 1, in which each lamella is rectangular in shape.

3. A heat exchanger according to claim 1, in which the radial length of the lamellae is such that the lamellae clear the inner wall of the holder.

4. A heat exchanger according to claim 1, in which the holder, the inner pipe, the fin, and the lamellae are made of a metal, the fin being welded to the inner pipe.

5. A heat exchanger according to claim 1, in which the lamellae are radially downwardly directed with respect to the inner pipe.

6. A heat exchanger according to claim 1, in which each lamella, viewed across its width, is directed downwardly along one radial edge thereof.

7. A heat exchanger according to claim 1, in which each lamella is radially downwardly directed with respect to the inner pipe and, viewed across its width, is also directed downwardly along one radial edge thereof.

8. A heat exchanger according to claim 1, in which the inner pipe comprises a first pipe closed at its upper end and at its lower end; and a second pipe extending coaxially within said first pipe, said second pipe being open at both ends and communicating at its upper end with the inlet of the first pipe, the lower end of said second pipe forming an outlet passing through the lower end of the first pipe; the space between the holder and the first pipe being connected near the upper end of the holder to a first inlet and to a second inlet and being connected near the lower end of the holder to an outlet.

9. A heat exchanger according to claim 1, in which the inner pipe is closed at its upper end, its lower end passing through the lower end of the holder and being connected to a vessel arranged outside the holder; the holder being provided near its lower end with a first outlet and being provided near its upper end with an inlet and a second outlet.

* * * * *